Sept. 13, 1927.  J. ALSFASSER  1,642,352
BRACKET
Filed July 23, 1924
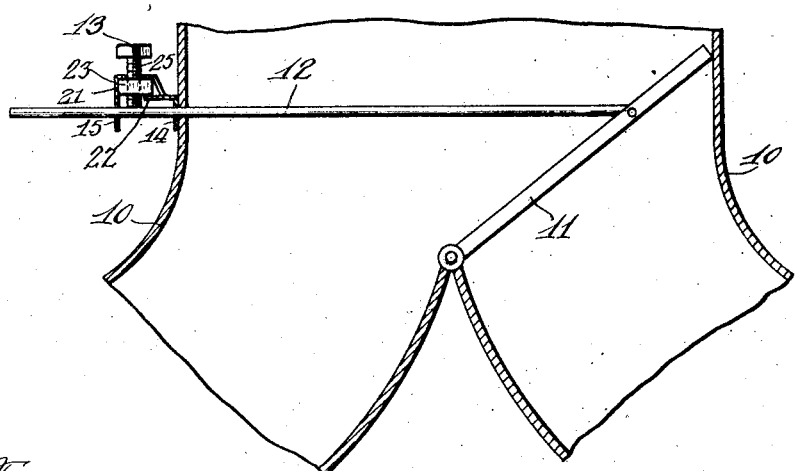
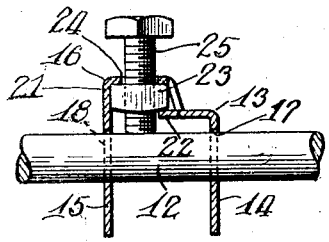
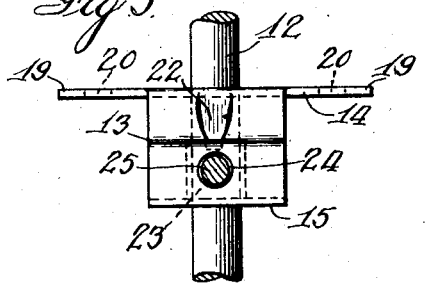
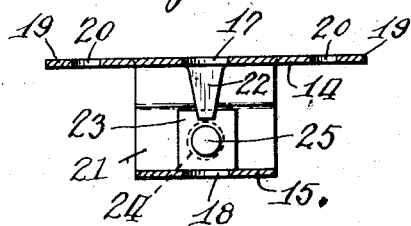
Inventor
Joseph Alsfasser
By Sprinkle & Smith
Attys.

Patented Sept. 13, 1927.

1,642,352

UNITED STATES PATENT OFFICE.

JOSEPH ALSFASSER, OF CHICAGO, ILLINOIS.

BRACKET.

Application filed July 23, 1924. Serial No. 727,619.

The invention relates to brackets and primarily to devices of this character which are designed to be associated with a ventilating or heating duct the bracket having means for controlling the position of the damper in said duct.

The invention has as its prime object the provision of a means whereby a threaded clamping member or screw may be arranged in threaded relation to a bracket formed of material the gauge of which is too thin to permit the formation of a thread therein, and in addition to construct the bracket so that a threaded element into which the screw or clamping member is adapted to be threaded, is held against rotation and separation relatively to the bracket and also is at all times held in proper relation to an aperture provided in the bracket through which the threaded clamping member or screw is passed into engagement with the threaded element and a part of the damper.

It is an object to construct the bracket to provide shoulders for engagement with the side faces of a nut to prevent its rotation and to stamp a tongue or projection from the material of the bracket for engaging the face of the nut to hold the nut against said shoulders and against separation from the bracket.

The invention will be explained and more readily understood when read in conjunction with the accompanying drawings which illustrate one embodiment which the invention is susceptible it being obvious however that changes and modifications may be resorted to without departing from the spirit of the appended claim forming a part hereof.

In the drawings Fig. 1 is a sectional view of a duct having the device applied thereto.

Fig. 2 is a sectional view of the bracket illustrated in Fig. 1.

Fig. 3 is a top plan view of the bracket and

Fig. 4 is a bottom plan view thereof.

The invention is illustrated in the drawings as associated with a duct 10 having a damper 11 pivotally arranged therein, the damper including a rod 12 which is designed to be engaged by certain elements of the bracket generally designated 13 so as to hold the damper 11 in any of its various adjusted positions. The bracket generally designated 13 is of a substantially U-shaped cross section which includes the legs 14, 15 and the connecting portion 16.

These legs 14 and 15 are each provided with an aperture respectively designated 17 and 18 through which the damper control rod 12 is passed. The leg 14 is provided with ears or projections 19 which are each provided with an aperture 20 for receiving a means whereby the bracket may be secured to a duct such as 10. The connecting portion 16 is, as clearly shown in Figs. 2, 3 and 4, formed to provide a channel-shaped part 21 and has formed therein a tongue 22 punched therefrom which projects towards the channel portion.

A threaded element 23 which, in the present instance is an ordinary nut, is arranged in the channel shaped portion 21, the nut being engaged at its opposite side faces by the walls forming the channel which thus holds the nut against rotation with respect to the bracket when arranged in the channel. The tongue 22 being designed to engage the face of the nut 23 to thereby hold the nut within the channel shaped portion and against separation therefrom.

From the foregoing description it is evident that a simple and inexpensive arrangement is provided whereby the threaded element such as the nut 23 may be arranged and held against rotation and also separation from the bracket.

One wall of the channel-shaped portion 21 is apertured as indicated at 24 to permit the passage of a screw-threaded clamping member 25 which clamping member is in threaded engagement with the nut and is provided to engage and hold the rod 12 of the damper 11 so that the latter may be held in any of its various adjusted positions depending upon desires or conditions.

It is manifest that by the present construction an arrangement is provided having means whereby sufficient pressure may be exerted upon the damper rod to hold it in any of its various positions, the means permitting the bracket to be formed of relatively thin gauge material, the gauge thereof preventing the formation of a thread therein of sufficient strength to withstand the force applied by the screw such as 25 when engaged with the damper rod 12.

It is further evident that an extremely simple and effective arrangement is provided whereby the internally threaded member or nut 23 may be held in its proper relative position with respect to the aperture 24 provided in the bracket and also held against rotation and accidental separation from the bracket yet will readily permit the removal of the internally screw threaded member or nut 23 should this at any time be found necessary or desirable.

Having thus described the invention what I claim and desire to cover by Letters Patent is:

A bracket, said bracket being substantially U-shaped, one leg of the U providing means for securing the bracket in place, both legs of the U being apertured to permit a rod to be passed therethrough, the portion of the U which connects the legs together having an offset and forming with the adjacent leg a channel-shaped portion to receive and hold a nut against rotation, a threaded nut in said channel-shaped portion, the wall of the channel-shaped portion intermediate the legs of the bracket having a tongue for engaging the nut to hold said nut in the said channel-shaped portion and against separation from the bracket, said tongue being cut from the body of the U-shaped bracket in the wall of the channel-shaped portion which is intermediate the legs of the bracket and being extended approximately at right angles to the legs of the brackets, there being an aperture in the channel-shaped portion through which a bolt may be passed into engagement with the nut, and with said rod.

In testimony whereof I have signed my name to this specification on this 21st day of July, A. D. 1924.

JOSEPH ALSFASSER.